Inventor
Armand Hadni
By Cushman, Darby & Cushman
Attorneys

United States Patent Office 3,374,392

Patented Mar. 19, 1968

3,374,392

CAMERA TUBE FOR INFRARED TELEVISION HAVING FERROELECTRIC STRIP FOR RECEIVING RADIATION

Armand Hadni, Paris, France, assignor to CSF—Compagnie Generale de Telegraphie Sans Fil, a corporation of France Filed Aug. 24, 1964, Ser. No. 391,631
Claims priority, application France, Aug. 27, 1963, 945,749, Patent 1,374,487
3 Claims. (Cl. 315—21)

ABSTRACT OF THE DISCLOSURE

The invention has for object a camera tube for infrared television of the charge storage type, including a ferroelectric strip, having a dielectric constant particularly sensitive to the local temperature variations.

The present invention relates to infrared television. So far thermal television has been limited to wavelengths less than 2.5$\mu$. However, maximum emission from a black body at room temperature takes place in the wavelength range about 10$\mu$. At lower temperatures, maximum emission corresponds to radiation at even longer wavelengths.

It is an object of the invention, to provide a camera tube for thermal television capable of translating radiations with wavelengths up to 10$\mu$ and beyond.

The camera tube according to the invention is of the charge storage type. It includes essentially a receiver consisting of a ferroelectric strip, with a dielectric constant particularly sensitive to the infrared.

The invention will be better understood from the following description and appended drawing, in which.

Figure 1:
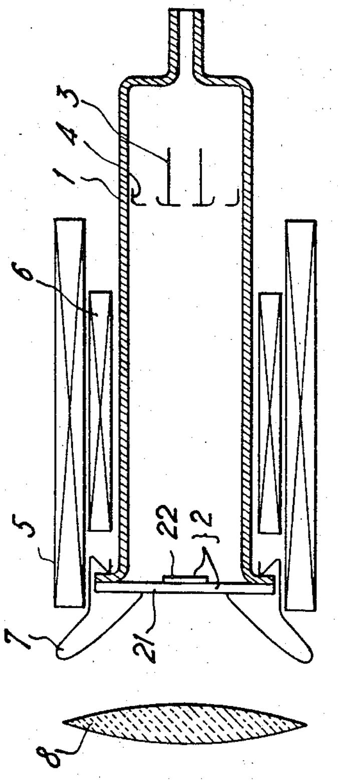
FIG. 1 is a diagrammatic view of a preferred embodiment of a tube according to the invention.

In FIG. 1, a camera tube comprises a receiving arrangement 2 which is provided with a window 21, transparent to the infrared and opaque to the visible spectrum 21, and a ferro-electric strip 22.

Tube 1 also includes a low velocity electron gun, an annular collector electrode 4, a focusing coil 5 and a scanning coil 6, a thermostat 7 and an objective lens 8, transparent to the infrared, and which can be replaced by a concave mirror. Elements 3 to 8 are well known in television and will not be described further.

Figure 2:
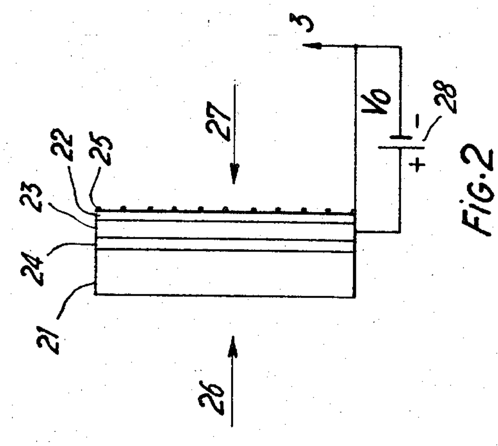
FIG. 2 shows, on an enlarged scale, a section across the receiver element of the tube.

FIG. 2 shows the receiver element 2 in greater detail, and on a much enlarged scale. Arrows 26 and 27 respectively indicate the directions of arrival of the incident radiation and of the scanning electron beam.

Ferro-electric strip 22, preferably of triglycine sulfate is semi-metallized with gold at 23 on its front side, so that the resistance of any square portion of the gold layer substantially reaches 500 ohms, which ensures for the assembly formed by layer 23 and strip 22 a practically total absorption of the radiation. Strip 22 is fixed to window 21, which is of sintered zinc sulphide or of germanium and is transparent to infrared radiation and opaque to visible radiation, for example by means of a Mylar foil 24. A metal grid 25 is deposited by evaporation of pure gold on the rear side of strip 22.

The grid is grounded. The semi-metallized side 23 is maintained at a fixed positive potential $V_o$, for example by connecting it to the positive pole of a generator 28, whose negative pole is connected to grid 25 and to the cathode of the electron gun 3.

Figure 3:
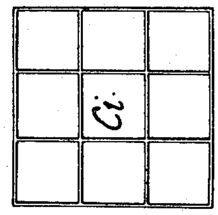
FIG. 3 is a rear view of this element, it being understood that by "front side" is meant the side of the tube which is subjected to thermal radiation.

FIG. 3 shows grid 25. As shown, grid 25 consists of four vertical lines and four horizontal lines building up meshes which form as many elements, each having one armature formed by the surface of the strip bounded by the corresponding mesh, and one armature formed by the part of the semi-metallized side 23 opposite this surface.

In practice, the number of meshes will be much greater, about 10,000 for example, for a radiation sensitive strip, of 15 mm. x 15 mm., this being a normal dimension for a camera tube.

The tube operates as follows:

The general operation of the tube is that of a low velocity electron scanning tube.

With the grid grounded and the semi-metallized side 23 held at a constant positive potential $V_o$, the elements of the crystal surface bounded by the grid are at a potential $KV_o$, where K is a coefficient of about ⅓, which is defined by the geometry of the grid and of the crystal.

Grid 25 comprises in fact, for example, $100\times100=10^4$ small capacitors of variable capacity C1, C2, C3 . . . C$n$ which depends on their temperature, i.e. on the point of the thermal image being scanned.

Low-velocity electron scanning, by gun 3 of FIG. 1, which is known in itself, raises their surfaces to the potential of the tube's cathode (not shown), hence of the grid, since the latter is grounded. The charge in a condenser passes from the value $Q_i=C_i\cdot V_o(1-K)$ before scanning, to the value $Q'_i=C_i\cdot V_o$, so that the electron beam deposits the charge $\Delta Q_i=K_i\cdot C_i\cdot V_o$.

The electron gun has to be so adjusted that the beam intensity is just sufficient to charge the elements of highest capacitance $C_M$; for the other elements, the excess of applied charge, $\Delta q_i=Q_M-Q_i$ or $\Delta q_i=KV_o(C_M-C_i)$ is returned to the cathode where it is received by the annular electrode 4 of FIG. 1, an electrode which could supply the video signal directly, but which is with advantage used as the first electrode of an electron multiplier tube, whose output signal will constitute the useful signal. This latter arrangement should be preferred on account of the small amplitude of the signal collected at electrode 4.

The electron charges deposited on the elements of the first line, for example, will flow towards the semi-metallized plate on the opposite side and will disappear after a time $t=RC$, characteristic of the dielectric (C being the average capacitance of one element and R the leakage resistance through the strip). With a suitable doping ($Cr^{3+}$ for instance) of the crystal, or the deposit of a very thin metallic film on the surface of the crystal, this time interval is of the order of a few milliseconds, i.e. lower than the duration of the image scanning, which is about 1/25-second. When the electron beam spot returns to the first line, all its elements will have returned to potential $KV_o$ and a fresh scanning of the local capacitors, hence of the temperatures, will be again possible, as for the first scanning described.

The charge variation $\Delta q_i$, and hence the corresponding video signal, are nil, if $C_i=C_M$ (unilluminated element when working at a temperature slightly above the Curio point), and a maximum if $C_i$ is a minimum (most illuminated element).

The relative variation of $\Delta q_i$, when passing from the unilluminated element M to an illuminated element $i$, can be written:

$$\frac{\delta(\Delta q_i)}{\Delta q_i}=\frac{CM-C_i}{M}\simeq\frac{1}{\epsilon_R}\frac{d\epsilon_R}{dT}dT$$

where $\epsilon_R$ and T respectively designate the dielectric constant of the strip and the temperature; $dT$ is the temperature difference between elements M and $i$.

Assuming a relative variation of dielectric constant, per degree absolute (or centigrade)

$$\frac{1}{\epsilon_R}\frac{d\epsilon_R}{dT}\simeq 1$$

as actually measured over a range fairly extended on either side of the Curie point, one has $$\frac{\delta \Delta q_i}{\Delta q_i}\simeq dT$$

expressed in degrees absolute (or centigrade).

If relative charge variations of 1% can be detected on the elementary surface portions of the receiver element then relative temperature variations, also of the order of 1%, will be detected thereon.

Obviously the video signal obtained in this way may be used for transmission purposes, as any other video signal.

Similarly it will be obvious that by using an optical system (lens or mirror, and tube input window) also transparent to the visible spectrum, the tube can also be used for television in that spectrum. However, the main value of the invention lies in its use for television in the far infrared.

It is to be understood that the invention is in no way restricted to the embodiment described, which has been given only as an example.

In particular, the materials used (gold, triglycine sulphate, Mylar, sintered zinc sulphide) may be replaced by any materials with respectively similar qualities; similarly, the thickness of the semi-metallized layer depends on the metal used and on the range of utilization of the receiver. The operating temperature may be above or below the Curie point.

In the first case, the effect is pure ferroelectrical. In the second case, it is mainly pyroelectrical. The effect is more appreciable, but is complicated by the localisation of free carriers at the limits of domains.

What is claimed is:

1. A camera tube comprising: a window transparent to infrared radiation; a ferroelectric strip positioned for receiving radiation through said window, said strip having a semi-metallized front side and a rear side covered with a metal grid; means for providing a fixed potential difference between said sides; and means for scanning point by point said rear side to obtain signals responsive to the respective charges of said points.

2. A camera tube comprising: a window transparent to infrared radiation; a ferroelectric strip positioned for receiving radiation through said window, said strip having a semi-metallized front side and a rear side covered with a metal grid; means for providing a fixed potential difference between said sides; means for providing a low velocity electron beam for scanning point by point said rear side; an electrode for receiving said beam upon reflection thereof by said rear side; and means for collecting an output signal at said electrode.

3. A camera tube comprising: a window transparent to infrared radiation; a triglycine sulphate strip positioned for receiving radiation through said window, said strip having a gold semi-metallized front side and a rear side covered with a gold grid; means for providing a fixed potential difference between said sides; means for providing a low velocity electron beam for scanning point by point said rear side; an electrode for receiving said beam upon reflection thereof by said rear side; and means for collecting an output signal at said electrode.

References Cited

UNITED STATES PATENTS

| | | | |
|---|---|---|---|
| 2,989,636 | 6/1961 | Lieb | 250—83.3 |
| 2,999,177 | 9/1961 | Null | 315—10 X |
| 3,185,891 | 5/1965 | Redington | 315—11 X |

ROBERT L. GRIFFIN, *Primary Examiner.*

DAVID G. REDINBAUGH, JOHN W. CALDWELL, *Examiners.*

T. A. GALLAGHER, R. K. ECKERT, Jr., *Assistant Examiners.*